Dec. 29, 1953　　　W. F. HERMAN　　　2,664,025
CONTACT LENSES AND METHOD OF MAKING SAME
Filed Oct. 6, 1949　　　　　　　　　　　　2 Sheets-Sheet 1

INVENTOR
WILLIAM F. HERMAN
BY
Louis L. Gagnon
ATTORNEY

Dec. 29, 1953 W. F. HERMAN 2,664,025
CONTACT LENSES AND METHOD OF MAKING SAME
Filed Oct. 6, 1949 2 Sheets-Sheet 2
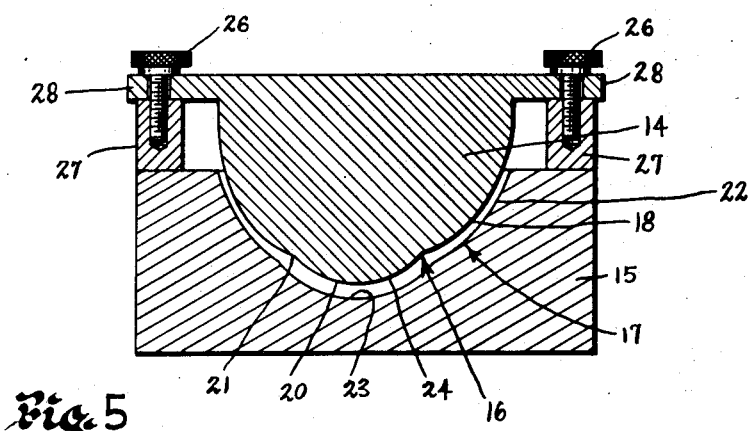
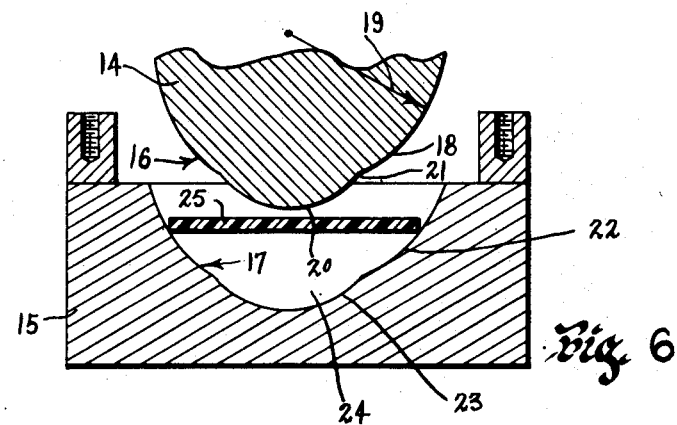
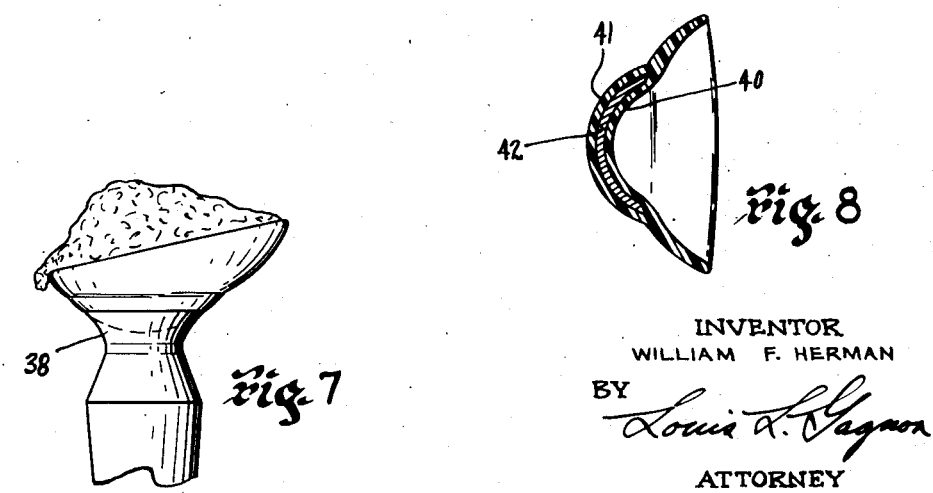
INVENTOR
WILLIAM F. HERMAN
BY
ATTORNEY Patented Dec. 29, 1953

2,664,025

UNITED STATES PATENT OFFICE 2,664,025

CONTACT LENSES AND METHOD OF MAKING SAME

William F. Herman, Sturbridge, Mass., assignor to American Optical Company, Southbridge, Mass., a voluntary association of Massachusetts Application October 6, 1949, Serial No. 119,803

6 Claims. (Cl. 88—54.5)

This invention relates to contact lenses and has particular reference to novel means and method of obtaining relatively accurate molds of patient's eyes and from which contact lenses can be made.

A principal object of the invention is to provide novel means and method of initially taking a mold of a patient's eye by forming a temperature critical fitting lens shaped to the general shape of the patient's eye, causing the scleral portion of the fitting lens to assume, as nearly as possible, the exact shape of the sclera of the patient's eye, forming a cast from the resultant fitting lens, and subsequently forming contact lenses directly from the cast.

Another important object is to provide novel means and method of initially forming a fitting lens of a temperature critical material shaped to the general shape of the visible portion of a patient's eyeball, causing the scleral portion of the fitting lens to assume, as nearly as possible, the exact shape of the sclera of the patient's eye by inserting the lens over the eyeball beneath the lids and applying heat and light pressure to cause the scleral portion to assume the shape of the corresponding portion of the eyeball, cooling the lens to make it rigid and to maintain its shape characteristics, and removing and subsequently making a cast from the resultant fitting lens for use in molding contact lenses to the shape of the fitting lens and consequently to the shape of the patient's eyeball.

Another object is to provide a fitting lens formed of a transparent temperature critical material having a scleral portion and a central optic section, the scleral portion of the lens, under action of body heat and light pressure, being adapted to conform, as nearly as possible, to the shape of the corresponding portion of the eyeball to which it is applied and upon subsequent cooling to maintain said shape.

Another object is to provide a fitting lens of the above character having a substantially rigid central optic section and a temperature critical scleral portion, the optic section being adapted to maintain a spaced relation with the corneal portion of the patient's eye during the fitting operation and, if desired, having a prescriptive power therein enabling the lens to be used for refracting the patient's eye.

Another object is to provide a fitting lens of the above character, and method of fitting same, formed with a substantially strain-free scleral portion of transparent temperature critical plastic material shaped to the general shape of the scleral portion of a patient's eyeball, the material being characterized by its ability to remain semi-rigid at normal room temperatures and to be pliable at body temperature or at temperatures slightly above body temperature and being readily conformable to the shape of the corresponding portion of the sclera of the patient's eye when subjected to body heat and slight pressures and which upon cooling will retain said shape and further characterized in the use of a colored liquid by which the fitting may be more accurately determined.

Other objects and advantages of the invention will become apparent from the following description taken in connection with the accompanying drawings, in which:

Fig. 5 is a sectional view of a pair of assembled mold halves used for initially forming the fitting lenses;

Fig. 6 is a fragmentary sectional view of the mold halves when separated to show the preferred method of placing a plastic disc in position for molding;

Fig. 7 is a fragmentary front view showing a method of supporting a fitting lens when used to form casts therefrom; and Fig. 8 is a transverse sectional view showing a modified fitting lens construction.

In the ophthalmic profession contact lenses, which are generally made partly or entirely of plastic material, are made by several different methods such as molding, machining and polishing, and heating and pressing. Contact lenses, however, embody several different parts or portions which must be accurately formed and finished, and since each of these parts may vary appreciably, depending upon the characteristics of the particular eye being fitted, the making of a good contact lens has been a difficult task. Prior art methods have generally proved to be unsatisfactory for various reasons, such as the number of necessary trial fittings of a lens and subsequent alterations thereto required before an acceptable and comfortable fit was obtained.

The present invention overcomes many of the disadvantages of the prior art by providing means and method of taking a mold of the individual eyeball being fitted and thereafter making one or more accurate contact lenses from the mold, which lenses will possess the desired shape and prescriptive characteristics without requiring repeated trial fittings and alterations.

Figure 1:
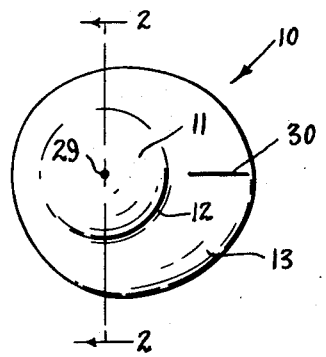
Fig. 1 is a front view of a plastic fitting lens made in accordance with the present invention.
Figure 2:
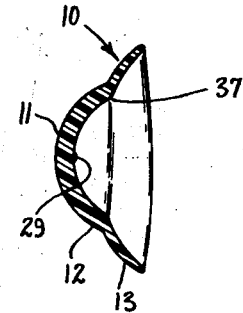
Fig. 2 is a transverse sectional view taken substantially on line 2—2 of Fig. 1.

Referring to the drawings in detail and particularly to Figs. 1 and 2, there is provided in accordance with the invention a fitting lens 10 shaped substantially to the shape of a contact lens and embodying a central, optic or corneal portion 11, an integral intermediate portion 12, and an integral scleral portion 13 formed entirely of plastic material. The plastic material used in forming the fitting lens possesses substantially semi-rigid shape retaining characteristics at room temperature but will, at body or slightly higher temperatures, become very pliant and may be shaped as desired. The preferred composition consists of approximately 85 parts polyvinyl butyral plasticized with approximately 15 parts methyl phthalyl ethyl glycolate and made into sheet form, the sheets being preferably about 1½ millimeters in thickness for best results. However, the sheets may, if desired, be appreciably thicker, or may be thinner and used as laminations. It is to be understood that the amount of plasticizer can be varied slightly to produce varying desired characteristics in the resultant plastic material; that is, the amount of plasticizer may be increased slightly, if it is desired to produce a plastic material of a slightly less rigid nature than produced with the preferred composition given above, or the amount of plasticizer may be decreased slightly to produce a more rigid plastic material. This is important since for many reasons it may be desired to use plastic materials having different characteristics such as when the resultant fitting lenses are to be used in exceptionally hot or cold climates.

Other compositions which can be used are: (1) About 85 parts polyvinyl butyral and about 15 parts of dibutyl cellosolve adipate, (2) n-butyl methacrylate, (3) vinyl chloride plasticized to desired consistency with plasticizer, (4) moderately high molecular weight vinyl acetate with plasticizer; or (5) plasticized methyl methacrylate.

Although plastic material in sheet form is preferred for the present method of manufacture of the fitting lenses, it is conceivable that it could be in granular form making the lenses by injection molding methods, or in the case of the plasticized methyl methacrylate material the lenses could be cast.

The fitting lens 10 is shaped substantially to the shape of a contact lens by providing an inner mold half 14 and an outer mold half 15, as shown in Fig. 5, the inner mold half 14 having accurately formed thereon a surface 16 of specific shape and the outer mold half 15 being shaped as desired of the outer or anterior surface of the initial fitting lens 10.

The surface 16 of the inner mold half 14 has accurately formed thereon a large convexly curved surface 18 which has a radius 19 which can be varied in producing fitting lenses of various sizes for accommodating eyeballs of various sizes. It is believed that three sizes of fitting lenses having respective radii 19 of 12, 13, and 14 millimeters will accommodate the large majority of individual eyeballs. A smaller convexly curved surface 20 is also accurately formed on the inner mold half 14, the curved surfaces 18 and 20 being joined by a somewhat short concavely curved surface 21, all surfaces 18, 20 and 21 having their adjacent edges smoothly blending into one another.

The complementary or outer mold half 15 is provided with a surface 17 having a large concavely curved surface 22 and a smaller concavely curved surface 23 which blend smoothly together. These curved surfaces 16 and 17 on the mold halves 14 and 15, when the halves are assembled, are spaced to form a mold cavity 24 therebetween of proper size and shape to produce a bell-shaped fitting lens.

In forming a fitting lens in accordance with the preferred method, a circular disc 25 is stamped or otherwise cut out of the plastic sheet material and is inserted in the mold cavity 24 of the outer mold half 15, as shown in Fig. 6. The disc 25 is preferably preheated slightly to render it somewhat pliable so that when pressure is exerted to the disc after it has been placed in the mold cavity 24, it will conform generally to the shape of the surface 17. It is to be understood, however, that the outer mold half 15 may be preheated whereupon the heat will be transferred to the disc 25 to cause the disc to become sufficiently pliable and conformable to the shape of the surface 17. The method of heating the plastic disc 25 is not important, however, since it is merely necessary that it be heated to such a state that it is rendered pliable and can be deformed from its original shape. At this time the inner mold half 14 is inserted in the mold cavity 24 and the studs 26 in the inner mold half 14 are threaded to their full extent into the uprights 27 provided therefor on the half 15 to compress the plastic material between the surfaces 16 and 17. The assembled unit is then subjected to heat, preferably in an oven, for about 30 minutes at approximately 130° C. It is particularly pointed out here, however, that the temperature for heating and the time interval can be varied considerably since it is merely necessary that the heat be of sufficiently high temperature and the time interval long enough to fully anneal the plastic material and that the temperature be at a low enough point to prevent decomposition of the material. The plastic material will then become softened and tend to assume the shape of the mold cavity 24. It may be desirable during the heating cycle to again tighten the studs 26 to insure that the flange portion 28 of the inner mold half 14 is in intimate engagement with the adjacent upper ends of the uprights 27. This will maintain the inner mold half 14 within the cavity in the outer mold half 15 to the extent necessary for production of a fitting lens of the desired size specifications.

At the end of the heating cycle the plastic material will be substantially molten and consequently strain free and will entirely fill the lower portion of the mold cavity 24.

When the assembled mold halves 14 and 15 are removed from the heat and cooled, the plastic material will harden and when removed from the mold halves will possess substantially the size and shape desired and the low heat softenable characteristics.

After the fitting lens 10 is removed it can be edge cut to exactly the size and shape desired and the edges deburred if necessary. The resultant lens will be shaped substantially as shown in Figs. 1 and 2.

After the fitting lens 10 has been sized and shaped as desired the edges can be polished. However, it is important that means be used for polishing which will not heat the material to a degree which will cause the lens to be deformed from its preferred shape. Solvent polishing has proved to be the most desirable method.

At this time it may be desirable to locate the center of the optic section 11 so that the fitting lens may be properly located on the patient's eyeball and the center subsequently identified on a mold formed from the fitting lens. This can be done in many ways, but preferably by forming a very small cavity on the inner or posterior surface of the optic section 11 at the center thereof and filling the cavity with a suitable coloring material to form a dot 29 which will be seen through the plastic material. It may also be desirable in some instances in order to properly locate the fitting lens on the patient's eyeball to mark the lens to identify a portion thereof; that is, a line 30 can be drawn with suitable coloring material on the portion of the lens to be positioned over the outer portion of the eyeball nearest the temple so that the transverse axis of the lens can easily be identified when the lens is positioned on the eyeball.

At this time, the fitting lens 10 being substantially rigid, a solution composed of fluorescein and sodium bicarbonate or other suitable colored buffer solution is prepared and the lens 10 held so that the solution can be poured into it. Prior to this the lens may be heated slightly to make it slightly pliant if desired. Then, with the patient's eyelids 31 retracted, the fitting lens 10 is applied to the eyeball 32 (Fig. 3) with the buffer solution 33 being disposed between the eyeball 32 and the lens 10. The eyelids 31 are then closed over the lens 10 and body heat will act upon the lens material to render it soft and pliable. If necessary to hasten the softening action heated pads may be applied to patient's eyes.

It will be noted here that at this time the fitting lens 10 will generally contact the eyeball 32 only along its peripheral edge 34. However, the heat of the patient's body will cause the lens scleral portion 13 to become softened and pliant and the pressure exerted by the lids 31 will cause intermediate portions thereof to engage the eyeball 32. This will, of course, cause some of the buffer solution 33 to exude from the space between the lens 10 and eyeball 32, which exudation will ooze out between the closed lids 31 and can be easily wiped away.

Upon opening the lids 31, the lens 10 can be easily positioned by directing its axis line 30 or other identification mark as desired and then locating the dot 29 marked in the optic section directly over the center of the pupil of the patient's eye. However, it may be desirable to mark the center of the optic section at this time rather than before the lens is positioned on the eyeball. This method is preferred where the lens seeks to maintain a comfortable fit with the eyeball while angled slightly or otherwise displaced from what is originally believed to be the correct position. Since comfort is important this slight displacement is permitted and a center can be marked on the outer surface of the lens with colored crayon or the like. At this time, since the buffer solution 33 is colored, the areas in which the scleral portion 13 of the lens 10 engage the eyeball 32 can be easily detected. Since it is desired that the entire or greater part of the scleral portion 13 conform to and assume the shape of the adjacent scleral portion 35 of the eyeball, the areas thereof which still remain spaced slightly from the sclera 35 can be gently massaged. This will cause the massaged scleral areas to conform to the shape of the eyeball. This massage treatment, however, should be very lightly done since it is undesirable to exert undue pressure which would cause deformation of the sensitive eyeball. Exudation of the buffer solution 33 will indicate whether the scleral portion 13 uniformly engages the sclera 35.

Figures 3, 4:
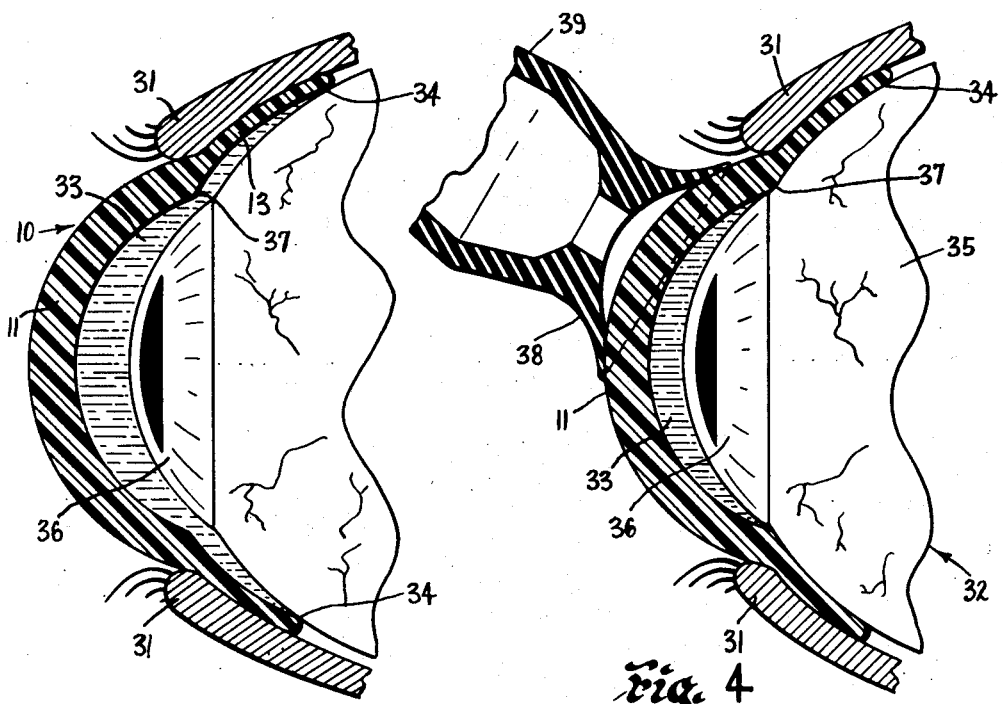
Fig. 3 is a fragmentary sectional view of an eye showing the initial engagement of a lens therewith during a fitting operation.
Fig. 4 is a fragmentary sectional view similar to Fig. 3 showing the relation between the lens and eye when the lens is finally fitted to the eye.

When a fitting lens 10 is properly fitted it will engage the eyeball substantially as shown in Fig. 4 wherein the entire inner surface of the thin scleral portion 13 conforms to the adjacent scleral portion 35 of the eyeball while the structurally stronger optic section 11 will remain spaced from the supersensitive limbus area 36 of the eye. The optic section 11, being of shorter radius and being formed with the thick marginal ring-like portion 37 formed by the surface 21 of the inner mold half 14 will not be deformed from its initial shape and consequently will remain spaced a predetermined distance from the limbus area 36 of the eye, with buffer solution 33 remaining only in this area.

At this time, if it is desired, since the power of the optic section 11 is known, the patient's eye can be refracted by conventional means.

After the fitting lens 10 has been made to properly conform to the shape of the patient's eye, the eye areas can be chilled by any suitable means such as by applying cold pads or causing cold air to flow thereover or other similar methods employed to cool the fitting lens 10 to such a temperature that it will become quite rigid and will retain its present shape. Suitable means such as a small suction cup 38 carried by a support 39 can be used to remove the hardened lens 10 as shown in Fig. 4. This can be easily done without pain to the patient by retracting the upper eyelid 31 and applying the cup 38 to the upper portion of the lens 10 and removing the lens by pivoting the upper edge 34 away from the eyeball and then sliding the lens upwardly from beneath the lower lid 31.

At this time it is preferable, though not essential, to chill the fitting lens 10 still more by immersion in cold water or the like to insure sufficient rigidity to retain the shape of the patient's eyeball.

The next step is to form a cast from the fitting lens 10. This is done by merely holding the lens 10 substantially in the position shown in Fig. 7 and pouring the desired composition into it by conventional means. The composition can be made of any suitable material such as plaster of Paris, dental stone, or the like which, when poured into the lens 10 and allowed to stand for a short while, will harden and when removed from the lens 10 will have substantially the shape of the original eyeball to which the lens 10 was fitted.

This plaster of Paris or like cast will when removed have a slight mark on the center of the optic section which will be made by the small cavity of the dot 29. This mark will identify the optic center of the cast.

From this cast there can be made any number of contact lenses. The final contact lenses can be made by conventional means and methods such as by initially forming enlarged bell-shaped "preforms" which are heated and, employing the phenomena of "plastic memory," collapsed over the cast and cooled. The resultant article can then be removed from the cast and cut to the desired contour shape and will possess all the desired shape and size characteristics so that when applied to the patient's eye it will fit as nearly perfectly thereto as possible.

The desired prescription will be given to the optic section during the initial forming of the "preform." The entire procedure of forming "preforms" and shaping them into final contact lenses is clearly described in copending U. S. application Serial Number 736,507, filed March 22, 1947.

It is to be understood that the fitting lens 10 described herein as having an integral optic section 11 can be provided with an optic section 11 made separately and attached to the temperature-critical sclera 13 by suitable means. It is also possible to form the fitting lens 10 as shown in Fig. 8, wherein there is provided a laminated structure embodying inner and outer layers 40 and 41 respectively having therebetween in the optic section a segment 42 formed of a transparent plastic material having substantially permanently rigid characteristics, such as unplasticized polyvinyl butyral. In forming a lens having such a construction the laminations 40 and 41 can be initially inserted in the mold cavity as thin discs having the rigid segment 42 therebetween, and upon application of heat and pressure in the manner described the entire laminated structure can be made into a substantially integral lens having the desired rigidity in the optic section and conformability in the scleral portion, without the necessity of being provided with the thickened ringlike portion 37 (Fig. 2) on the posterior surface.

It is also to be understood that although the inner mold half 14 is provided with surface curvature 21 for forming the thickened ringlike portion 37 on the posterior surface of the lens 10, the proper reinforcement to prevent deformation of the optic section 11 from its initial shape can be provided by inserting a small metallic ring in the material in the area bordering the optic section 11 or by reinforcing the optic section with a more rigid material.

From the foregoing it will be seen that novel means and methods are provided for making a cast of a patient's eyeball, which cast will possess all the necessary shape characteristics required for the efficient production of accurate contact lenses, the entire procedure being easily and efficiently accomplished without pain or excessive discomfort to the patient and without requiring the use of complicated or expensive equipment.

While certain novel features of the invention have been shown and described and are pointed out in the annexed claims, it will be understood that various omissions, substitutions and changes in the forms and details of the means and method illustrated and described may be made by those skilled in the art without departing from the spirit of the invention.

I claim:

1. A fitting lens adapted for use in forming contact lenses comprising a cup-like member that is transparent and has the general shape and size of a contact lens, said lens including a central portion to simulate the corneal portion of a contact lens and a surrounding scleral portion whose inner surface is shaped to the approximate shape of the surface of the average person's sclera, said scleral portion being formed of a temperature-critical, thermoplastic, tough, transparent synthetic resin and being characterized by its ability to repetitively soften and become pliable when subjected to approximately body temperature and to be relatively rigid and shape-retaining when subjected to normal room temperatures, said lens being positionable over a person's eye where its scleral portion under slight pressure will conform to the person's sclera under the action of the patient's body heat and when removed from said person's eye and subjected to room temperature will hold said shape and be sufficiently rigid and shape-retaining to allow an impression to be taken of the inner surface shape of said scleral portion of the fitting lens which may be then used to form a contact lens having an accurately shaped inner scleral surface.

2. A fitting lens adapted for use in forming contact lenses comprising a cup-like member that is transparent and has the general shape and size of a contact lens, said lens including a central circular portion simulating the corneal portion of a contact lens and having its inner surface of a sharper curvature than the corneal shape of the average person's eye, said lens having a surrounding scleral portion whose inner surface is shaped to the approximate shape of the surface of the average person's sclera, said corneal portion having a center mark and the scleral portion having an axis indicating mark, said scleral portion being formed of a temperature-critical, thermoplastic, tough, transparent synthetic resin and being characterized by its ability to repetitively soften and become pliable when subjected to approximately body temperature and to be relatively rigid and shape-retaining when subjected to normal room temperatures, said lens being positionable over a person's eye where its scleral portion under slight pressure will conform to the person's sclera under the action of the patient's body heat and when removed from said person's eye and subjected to room temperature will hold said shape and be sufficiently rigid and shape-retaining to allow an impression to be taken of the inner surface shape of said scleral portion of the fitting lens which may be then used to form a contact lens having an accurately shaped inner scleral surface.

3. A fitting lens adapted for use in forming contact lenses comprising a cup-like member that is transparent and has the general shape and size of a contact lens, said lens including a central portion simulating the corneal portion of a contact lens having an inner concave surface of a sharper curvature than the corneal shape of the average person's eye, said corneal portion containing an insert of transparent rigid material to assist said portion in retaining its shape during normal use of the lens, said lens further having a surrounding scleral portion whose inner surface is shaped to the approximate shape of the surface of the average person's sclera, said scleral portion being formed of a temperature-critical, thermoplastic, tough, transparent synthetic resin and being characterized by its ability to repetitively soften and become pliable when subjected to approximately body temperature and to be relatively rigid and shape-retaining when subjected to normal room temperatures, said lens being positionable over a person's eye where its scleral portion under slight pressure will conform to the person's sclera under the action of the patient's body heat and when removed from said person's eye and subjected to room temperature will hold said shape and be sufficiently rigid and shape-retaining to allow an impression to be taken of the inner surface shape of said scleral portion of the fitting lens which may be then used in forming a contact lens having an accurately shaped inner scleral surface.

4. A fitting lens adapted for use in forming contact lenses comprising a cup-like member that is transparent and has the general shape and size of a contact lens, said lens including a central portion to simulate the corneal portion of a contact lens and a surrounding scleral portion whose inner surface is shaped to the approximate shape of the surface of the average person's sclera, said scleral portion being formed of transparent polyvinyl butyral sufficiently and permanently plasticized so as to be characterized by its ability to repetitively soften and become pliable when subjected to approximately body temperature and to be relatively rigid and shape-retaining when subjected to normal room temperatures, said lens being positionable over a person's eye where its scleral portion under slight pressure will conform to the person's sclera under the action of the patient's body heat and when removed from said person's eye and subjected to room temperature will hold said shape and be sufficiently rigid and shape-retaining to allow an impression to be taken of the inner surface shape of said scleral portion of the fitting lens which may be then used in forming a contact lens having an accurately shaped inner scleral surface.

5. The method of taking a cast of a person's eye for use in the manufacture of contact lenses and the like comprising the steps of applying over the person's eye a transparent fitting lens having a thermoplastic scleral portion which softens and becomes pliable when so positioned over the person's eye and becomes relatively rigid and shape retaining when cooled to near room temperature and providing a colored buffer solution between the fitting lens and the person's eye, then as the lens is heated by the patient's body applying light pressure to the scleral portion of said lens until the colored buffer solution has been removed, which gives an indication that the inner surface of the scleral portion of the fitting lens conforms to the sclera of the person's eye, then cooling the lens to set the scleral portion thereof to said conformed shape, removing the fitting lens from the person's eye while set to said shape, and while at near room temperature using it as a mold to cast a positive of the scleral surface of said person's eye, said positive being subsequently useful to shape the inner surface of a contact lens blank to fit the sclera of said person's eye.

6. The method of taking a cast of a person's eye for use in the manufacture of contact lenses and the like comprising the steps of applying over the person's eye a transparent fitting lens having a relatively permanently rigid central portion and a surrounding thermoplastic scleral portion which softens and becomes pliable when so positioned over the person's eye and becomes relatively rigid and shape-retaining when cooled to near room temperature and providing a buffer solution between the fitting lens and the person's eye, centering said central portion of the lens with respect to the person's eye, then as the lens is heated by the patient's body applying light pressure to the scleral portion of said lens until the buffer solution has been removed, which gives an indication that the inner surface of the scleral portion of the fitting lens conforms to the sclera of the person's eye, then cooling the lens to set the scleral portion thereof to said conformed shape, removing the fitting lens from the person's eye while set to said shape, and while at near room temperature using it as a mold to cast a positive of the scleral surface of said person's eye, said positive being subsequently useful to shape the inner surface of a contact lens blank to fit the sclera of said person's eye.

WILLIAM F. HERMAN.

References Cited in the file of this patent

UNITED STATES PATENTS

| Number | Name | Date |
|---|---|---|
| 1,834,763 | Bonsieur | Dec. 1, 1931 |
| 2,133,498 | Dittmer | Oct. 18, 1938 |
| 2,178,873 | Feinbloom | Nov. 7, 1939 |
| 2,240,157 | Gagnon | Apr. 29, 1941 |
| 2,241,415 | Moulton | May 13, 1941 |
| 2,250,521 | Boeder | July 29, 1941 |
| 2,300,210 | Dittmer | Oct. 27, 1942 |
| 2,369,758 | Sheldon | Feb. 20, 1945 |

FOREIGN PATENTS

| Number | Country | Date |
|---|---|---|
| 493,366 | Great Britain | Oct. 6, 1938 |